(12) United States Patent
Gassmann et al.

(10) Patent No.: US 7,806,797 B2
(45) Date of Patent: Oct. 5, 2010

(54) BALL RAMP ASSEMBLY WITH VARIABLE PITCH OF THE BALL GROOVES

(75) Inventors: Theodor Gassmann, Siegburg (DE);
Mark Schmidt, Königswinter (DE);
Kurt Müller, Merzenich (DE); Kai Sorge, St. Augustin (DE)

(73) Assignee: GKN Driveline International GmbH, Lohmar (DE)

( * ) Notice: Subject to any disclaimer, the term of this patent is extended or adjusted under 35 U.S.C. 154(b) by 722 days.

(21) Appl. No.: 11/552,301

(22) Filed: Oct. 24, 2006

(65) Prior Publication Data
US 2007/0105684 A1 May 10, 2007

(30) Foreign Application Priority Data
Nov. 8, 2005 (DE) .................. 10 2005 053 555

(51) Int. Cl.
*F16H 48/06* (2006.01)
(52) U.S. Cl. ................. 475/220; 475/249; 475/328; 192/54.52; 192/84.7
(58) Field of Classification Search .......... 475/149, 475/150, 152, 153, 154, 198, 199, 204, 205, 475/220, 221, 223, 224, 225, 231, 235, 239, 475/240, 242, 249, 323, 327, 328; 192/35, 192/54.52, 93 A, 84.7
See application file for complete search history.

(56) References Cited

U.S. PATENT DOCUMENTS

| | | | |
|---|---|---|---|
| 2,848,086 A * | 8/1958 | Warsaw | 192/93 A |
| 3,330,391 A | 7/1967 | Mamo | |
| 3,546,968 A | 12/1970 | Altmann | |
| 3,664,474 A | 5/1972 | Blake et al. | |
| 3,791,501 A * | 2/1974 | Culbertson | 192/93 A |
| 3,886,813 A | 6/1975 | Baremor | |
| 4,294,340 A | 10/1981 | Kunze | |
| 4,770,651 A | 9/1988 | Friedrich | |
| 4,774,857 A * | 10/1988 | Heine et al. | 475/142 |
| 4,790,213 A * | 12/1988 | Lasoen | 475/328 |
| 4,903,804 A | 2/1990 | Beccaris et al. | |
| 4,921,085 A | 5/1990 | Takemura et al. | |
| 4,924,989 A | 5/1990 | Filderman | |

(Continued)

FOREIGN PATENT DOCUMENTS

AT 004939 U1 12/2001

(Continued)

*Primary Examiner*—David D Le
*Assistant Examiner*—Justin Holmes
(74) *Attorney, Agent, or Firm*—Rader, Fishman & Grauе PLLC

(57) ABSTRACT

An axial setting device includes two discs which are centered on a common axis. One is axially supported and the other one is axially displaceable, and at least one is rotatingly drivable. The two discs on their end faces, each have a plurality of circumferential ball grooves. The ball grooves each comprise a depth which decreases in the same direction, and each pair of opposed ball grooves accommodates a ball. At least the ball grooves of one of the two discs, starting from the region of the greatest groove depth, comprise a first groove portion with a greater pitch and an adjoining second groove portion with a smaller pitch, wherein the first groove portion extends over a smaller circular-arch-shaped portion than the second groove portion.

19 Claims, 5 Drawing Sheets

U.S. PATENT DOCUMENTS

| | | | |
|---|---|---|---|
| 4,950,214 A | 8/1990 | Botterill | |
| 5,010,992 A | 4/1991 | Maurer | |
| 5,037,353 A | 8/1991 | Suzuki et al. | |
| 5,080,640 A | 1/1992 | Botterill | |
| 5,102,378 A | 4/1992 | Gobert | |
| 5,106,349 A | 4/1992 | Botterill et al. | |
| 5,358,084 A | 10/1994 | Schramm | |
| 5,372,106 A | 12/1994 | Botterill | |
| 5,454,762 A | 10/1995 | Sawase et al. | |
| 5,469,948 A | 11/1995 | Organek et al. | |
| 5,497,845 A | 3/1996 | Shibahata | |
| 5,518,095 A | 5/1996 | Gassmann | |
| 5,620,072 A | 4/1997 | Engle | |
| 5,692,987 A | 12/1997 | Shibahata et al. | |
| 5,713,445 A | 2/1998 | Davis et al. | |
| 5,720,372 A | 2/1998 | Shino et al. | |
| 5,810,141 A | 9/1998 | Organek et al. | |
| 5,819,883 A | 10/1998 | Organek et al. | |
| 5,890,573 A | 4/1999 | Kwoka | |
| 6,003,395 A | 12/1999 | Rogg et al. | |
| RE36,502 E | 1/2000 | Organek et al. | |
| 6,056,660 A | 5/2000 | Mimura | |
| 6,296,590 B1 | 10/2001 | Gassmann | |
| 6,302,251 B1 | 10/2001 | Fair et al. | |
| 6,354,979 B1 | 3/2002 | Lohr | |
| 6,422,367 B1 | 7/2002 | Reuschel et al. | |
| 6,460,677 B1 | 10/2002 | Roscoe | |
| 6,561,939 B1 | 5/2003 | Knapke | |
| 6,571,928 B1 | 6/2003 | Gassmann | |
| 6,578,693 B2 | 6/2003 | Mayr | |
| 6,581,741 B2 | 6/2003 | Taureg | |
| 6,591,714 B2 | 7/2003 | Lee | |
| 6,659,250 B2 | 12/2003 | Nestler et al. | |
| 6,666,315 B2 | 12/2003 | Organek et al. | |
| 6,681,912 B2 | 1/2004 | Suzuki et al. | |
| 6,691,845 B2 | 2/2004 | Showalter | |
| 6,715,375 B2 | 4/2004 | Nestler | |
| 6,758,782 B2 | 7/2004 | Matzschker et al. | |
| 6,848,555 B2 | 2/2005 | Sakata et al. | |
| 6,851,537 B2 | 2/2005 | Bowen | |
| 6,927,376 B2 | 8/2005 | Marold | |
| 7,000,492 B2 | 2/2006 | Hulsebusch et al. | |
| 7,037,231 B2 | 5/2006 | Showalter | |
| 7,083,541 B2 * | 8/2006 | Pecnik et al. | 475/221 |
| 7,338,404 B2 * | 3/2008 | Gassmann et al. | 475/231 |
| 7,442,143 B2 * | 10/2008 | Gassmann et al. | 475/221 |
| 2005/0159264 A1 | 7/2005 | Puiu et al. | |
| 2007/0155573 A1 * | 7/2007 | Gassmann et al. | 475/205 |
| 2007/0186690 A1 * | 8/2007 | Gassmann et al. | 73/862.322 |

FOREIGN PATENT DOCUMENTS

| | | |
|---|---|---|
| DE | 933186 | 9/1955 |
| DE | 1805396 U | 2/1960 |
| DE | 31220 | 10/1964 |
| DE | 3815225 C2 | 11/1989 |
| DE | 3844306 A1 | 7/1990 |
| DE | 4007506 C1 | 10/1991 |
| DE | 4418891 A1 | 1/1995 |
| DE | 69019929 T2 | 12/1995 |
| DE | 19650039 A1 | 6/1997 |
| DE | 10033482 A1 | 10/2001 |
| DE | 10313739 A1 | 10/2003 |
| DE | 10342164 A1 | 4/2005 |
| EP | 0093813 B1 | 9/1986 |
| EP | 0315214 A2 | 5/1989 |
| EP | 0881406 A2 | 12/1998 |
| EP | 0936370 A1 | 8/1999 |
| FR | 1093488 | 5/1955 |
| GB | 940405 | 10/1963 |
| GB | 2182735 | 10/1985 |
| WO | WO 03066362 A1 * | 8/2003 |

* cited by examiner

BALL RAMP ASSEMBLY WITH VARIABLE PITCH OF THE BALL GROOVES

TECHNICAL FIELD

The invention relates to an axial setting device in the form of a ball ramp assembly for loading a multi-plate coupling.

BACKGROUND OF THE INVENTION

The ball ramp assembly comprises an axially supported disc and a disc which is axially displaceable relative thereto. On their end surfaces facing one another, the two discs comprise a plurality of circumferentially distributed ball grooves which, around their respective circumference, comprise a depth which is variable in opposite directions. Each two ball grooves positioned opposite one another form a pair and in each pair of ball grooves, a ball is held by which the discs axially support one another. The two discs can be rotated relative to one another by a motor, with a rotation effecting an axial displacement of the axially displaceable disc relative to the axially supported disc, and thus an actuation of the multi-plate coupling.

Axial setting devices of this type for actuating multi-plate couplings are widely used in the drivelines of motor vehicles. The multi-plate couplings can be used as locking couplings in differential drives, or as so-called hang-on couplings for optionally driving an additional driving axle, or as friction couplings for achieving a variable torque distribution between two driving axles of a differential drive.

From U.S. Pat. Nos. 4,950,214 and 5,106,349, there are known axial setting devices of said type for actuating locking couplings in differential drives. In order to achieve a rapid reaction behavior in a first actuation phase and accurate coupling control in a second actuation phase, the ball grooves comprise non-linear control curves having initially a steeper, and then, a progressively flattening profile. Thus, in the first actuation phase, there is achieved a high rate of spread between the discs, and in the second actuation phase there is achieved a low rate of spread.

U.S. Pat. No. 6,571,928 discloses a two-stage ball ramp assembly with a setting disc and a supporting disc which are rotatable relative to one another. The supporting disc, on its side facing away from the setting disc, comprises a plurality of ramps which cooperate with ramps which are provided at the housing and whose depth varies around the circumference in opposite directions. Furthermore, the supporting disc, in its surface facing the setting disc, comprises ball grooves with a circumferentially variable depth. The angle of the ramps is steeper than the angle of the ball grooves.

U.S. Pat. No. 7,000,492 discloses a ball ramp assembly which provides spring support during the return movement. In the region adjoining an end position defined by the greatest groove depth, the ball grooves comprise a rising run-out which, when the two discs are rotated beyond the end position, cause the discs to move away from one another.

Especially in differential assemblies provided for a variable torque distribution, as known from DE 103 42 164 A1 for example, there is required a rapid and accurate friction coupling control by means of suitable axial setting devices in order to ensure the driving stability of the motor vehicle. Thus, there exists a need for an improved ball ramp assembly with a quick reaction time.

SUMMARY OF THE INVENTION

The present invention provides an improved axial setting device for actuating a friction coupling. The axial setting device reacts quickly and is easy to control.

In one embodiment, an axial setting device is provided in the form of a ball ramp assembly, such as for actuating a friction coupling in the driveline of a motor vehicle, comprising two discs which are centered on a common axis, of which one is axially supported and the other one is axially displaceable and of which at least one is rotatingly drivable. The two discs, on their end faces facing one another, each comprise an identical plurality of ball grooves extending in the circumferential direction. In a plan view of the end faces, the ball grooves, starting from a region of the greatest groove depth, each comprise a depth which decreases in the same circumferential direction, wherein in each pair of opposed ball grooves there is accommodated a ball via which the first and the second disc are supported relative to one another. At least the ball grooves of one of the two discs, starting from the region of the greatest groove depth, comprise a first groove portion with a greater pitch and an adjoining second groove portion with a smaller pitch, the two pitches being different from zero, and wherein the first groove portion extends over a smaller circular-arch-shaped portion than the second groove portion.

The advantage of the inventive axial setting device is that— starting from an non-actuated position in which the two discs comprise the axially shortest distance from one another— initially a greater axial setting path is covered as a function of the angle of rotation in order to overcome the play of the multi-plate coupling. This results in a particularly short reaction time of the system. The second groove portion adjoining the first groove portion comprises a flatter pitch, so that there is obtained a shorter axial setting path as a function of the angle of rotation. The second groove portion serves to control the friction coupling in its operating range. The flat pitch leads to a sensitive adjustment of the axial setting device in the second groove portion and thus to a particularly accurate control of the friction coupling, so that the distribution of torque in the driveline of the motor vehicle can be controlled as required. Because the first groove portion extends over a smaller circular-arch-shaped portion than the second groove portion, there is achieved a particularly short reaction time on the one hand, and a particularly sensitive control in the operating range on the other hand.

The inventive axial setting device is suitable for various applications, for example for actuating a locking coupling in a differential drive, a hang-on coupling for optionally driving an additional driving axle or a friction coupling for providing a variable torque distribution between two driving axles of a differential drive. In the latter case, the advantages described are particularly pronounced.

According to another embodiment, the first groove portion extends over a circular-arch-shaped portion which is reduced in size by a multiple relative to a circular-arch-shaped portion of the second groove portion. The ratio of the circular-arch-shaped portion of the first groove portion relative to the circular-arch-shaped portion of the second groove portion can be smaller than 0.2, i.e. $\alpha/\beta<0.2$. This results in a particularly short reaction time and easy controllability in the operating range. In principle, the number of pairs of ball grooves is freely selectable, but it should at least be three in order to ensure uniform support around the circumference. Preferably, there are provided five circumferentially distributed pairs of ball grooves to ensure that the surface pressure occurring in the respective contact points between the ball and ball groove is low. In a preferred embodiment, the axially displaceable disc is radially supported entirely relative to the supported disc via the balls running in the ball grooves. There is thus no need for additional bearings.

When five ball grooves are used, the first groove portions, starting from a region of maximum groove depth, can extend over a circular-arch-shaped portion of maximum 10°. The second groove portions adjoining the first groove portions can extend over a circular-arch-shaped portion of maximum 50°. Between the two groove portions there is provided a connecting transition portion which comprises a relatively short length and a small radius. Furthermore, the first groove portion can comprise a linear pitch which, according to an advantageous embodiment, ranges between 5° and 10°. This results in a particularly short reaction time. The second groove portion can comprise a linear pitch which, according to another advantageous embodiment, ranges between 1.5° and 2.5°. This achieves easy control of the friction coupling.

According to a further embodiment, at least some of the pairs of ball grooves, in the region of their maximum groove depth, comprise deepened engagement recesses relative to the first groove portion, which recesses can be engaged by the respective balls in order to define a zero point position of the discs. The engagement recesses are provided in both ball grooves arranged opposite one another. The ball grooves of the remaining pairs in the region of their maximum groove depth are designed in such a way that the associated balls are free relative to the groove base, which means that the remaining ball grooves comprise greater depths. To achieve a zero point definition which is as accurate as possible, it is advantageous to provide a small number of ball grooves with engagement recesses. To achieve a simple production process, it is advantageous if all ball grooves comprise engagement recesses. The engagement recesses can be shaped in such a way that, if viewed in a circumferential section through the groove base, the balls are supported in two points, with the engagement recesses in each case extending over part of the circular-arch-shaped portion of the first groove portion.

According to yet a further embodiment, all ball grooves of the two discs in the region adjoining a starting position represented by the maximum groove depth comprise a rising run-out. The run-out ensures in an advantageous way that, during the return movement, the two discs are permitted to rotate relative to one another beyond the maximum groove depth. The two discs again move away from one another, so that the spring mechanism is again shortened. In consequence, the rotor mass and the entire rotational mass of the drive are spring-suspended via the returning force of the spring when swinging beyond the end position. If viewed in a cylindrical section through the groove base, the run-outs of the ball grooves are arch-shaped and concave, with the arch having a greater radius than the balls.

The ball grooves of the two discs preferably correspond to one another. It is common practice for an annular-disc-shaped cage to be arranged between the two discs, in whose windows the balls are held in a defined position relative to one another in the circumferential direction. In a particular embodiment, the axially displaceable disc is spring loaded towards the axially supported disc in order to effect a return movement in the non-actuated condition.

A further solution provides a transmission assembly for variably distributing torque in the driveline of a motor vehicle, comprising a first shaft which is supported relative to a stationary housing so as to be rotatable around a longitudinal axis; a second shaft coaxially arranged and drivingly connected to the first shaft; a transmission stage arranged in the torque flow between the first shaft and the second shaft and having a first sun gear connected to the second shaft in a rotationally fast way, a second sun gear connected to the first shaft in a rotationally fast way, at least one planetary gear engaging the two sun gears, and a carrier element carrying the at least one planetary gear and being able to rotate around the longitudinal axis; a friction coupling which serves to couple the carrier element to the housing and which comprises outer plates connected to the housing in a rotationally fast way and inner plates connected to the carrier element in a rotationally fast way, wherein the outer plates and the inner plates are arranged axially alternately and jointly form a plate package; an axial setting device in the form of a ball ramp assembly with two discs which are centered on the axis, of which one is axially supported relative to the housing and of which the other one is axially displaceable and of which at least one is rotatingly drivable, wherein the axially displaceable disc is loaded by a spring towards the axially supported disc, wherein the two discs, on their end faces facing one another, each comprise an identical plurality of ball grooves extending in the circumferential direction, wherein the ball grooves, in a plan view of the end faces, starting from a region of the greatest groove depth, each comprise a depth which decreases in the same circumferential direction, wherein in pairs of opposed ball grooves, there is accommodated a ball via which the first and the second disc are supported relative to one another, wherein at least the ball grooves of one of the two discs comprise a first groove portion with a greater pitch and an adjoining second groove portion with a smaller pitch, wherein the first groove portion extends over a smaller circular-arch-shaped portion than the second groove portion.

The axial setting device can be designed in accordance with the above embodiment. The inventive differential assembly has the same above-mentioned advantages of rapid actuation until the play of the plates of the friction coupling has been overcome and of an accurate controllability in the operating range of the friction coupling. This is particularly advantageous in the case of a transmission assembly for variably distributing torque wherein it is important to achieve rapid and accurate control of the driving dynamics.

Other advantages and features of the invention will also become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

DETAILED DESCRIPTION OF THE DRAWINGS

Figure 1:
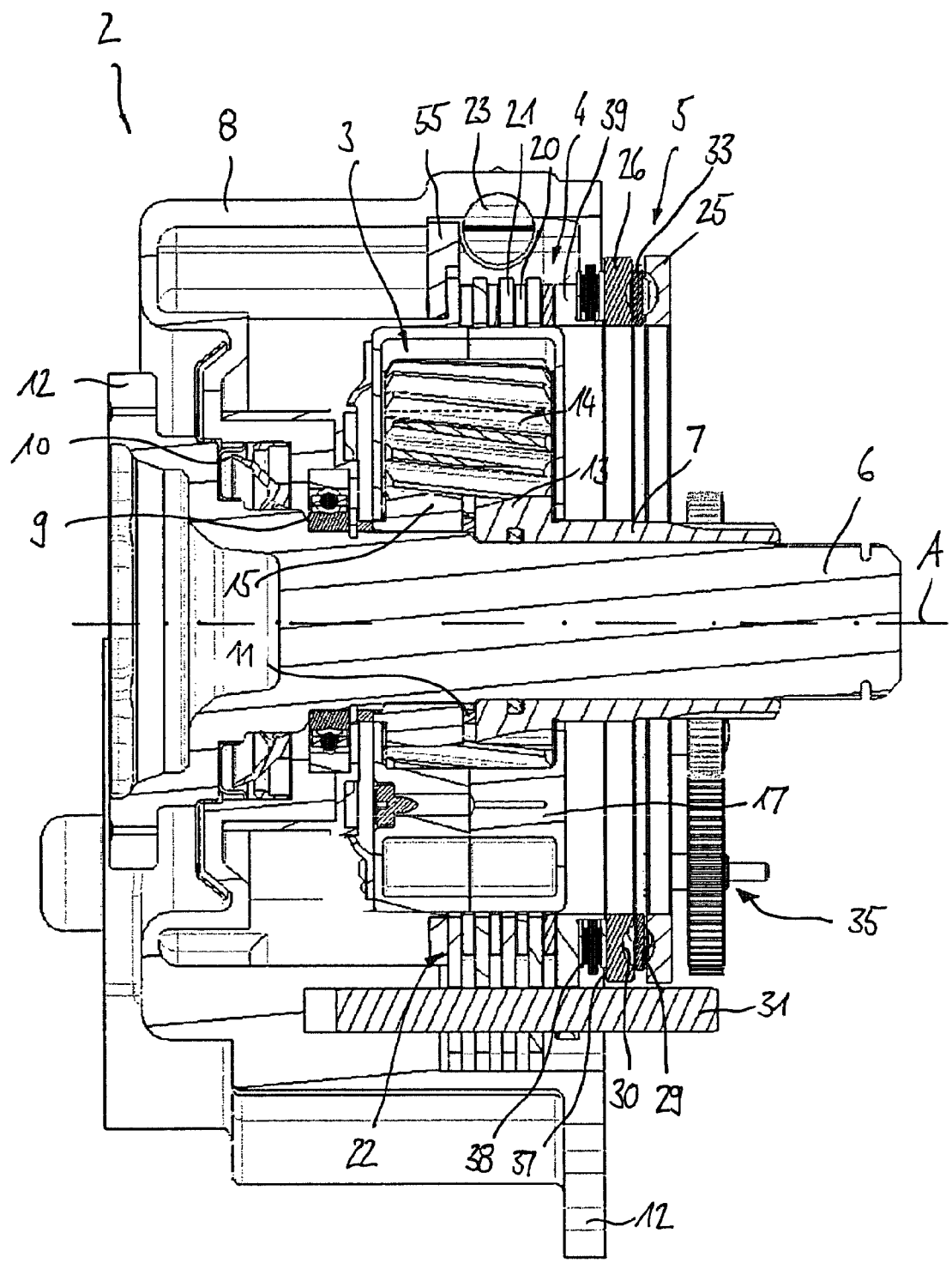
FIG. 1 is a longitudinal section through a transmission assembly having an inventive axial setting device.
Figure 2:
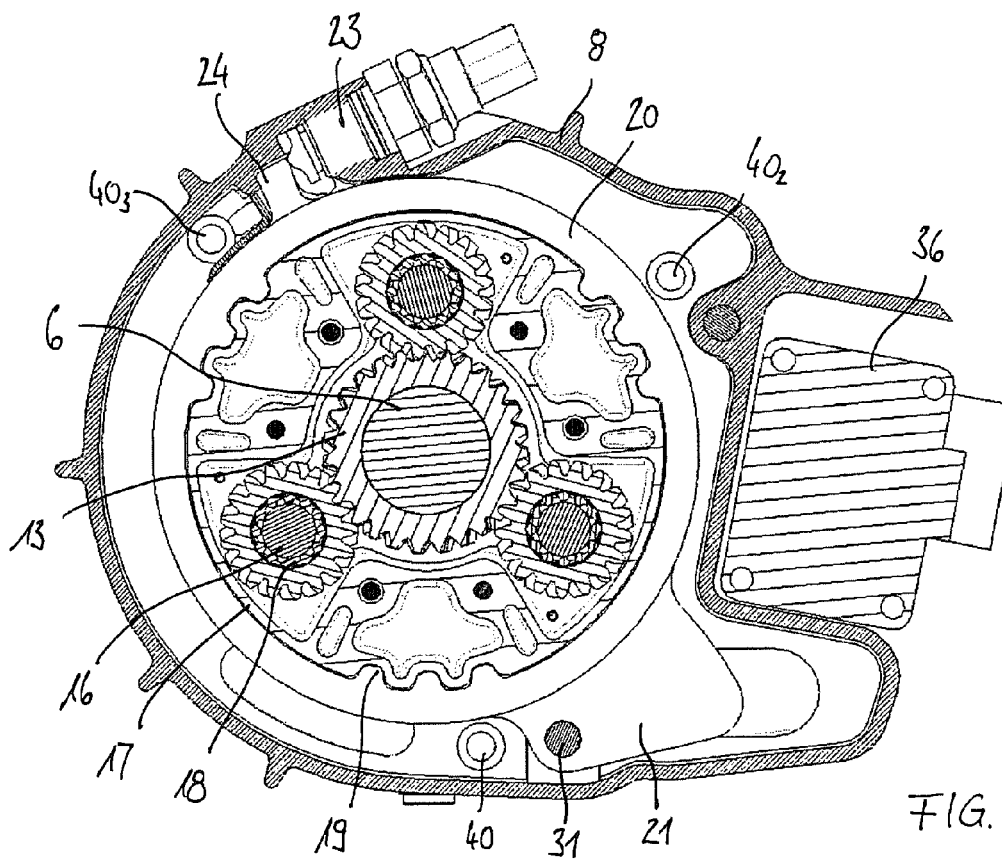
FIG. 2 is a cross-section through a transmission assembly according to FIG. 1.

FIGS. 1 and 2 will be described jointly below. They show a transmission assembly 2 comprising a transmission stage 3, a friction coupling 4 and an axial setting device 5, which units are arranged coaxially on an axis of rotation A. The axial setting device 5 serves to actuate the friction coupling 4 which, in turn, controls the transmission stage 3. The transmission assembly 2 serves to variably distribute torque in the driveline of a motor vehicle between two driveshafts. One application for such a transmission assembly is described in connection with FIG. 7.

The transmission assembly 2 also comprises a housing 8, a first shaft 6 rotatably supported in the housing on an axis of rotation A as well as a second shaft 7 rotatably and coaxially supported on the first shaft. The first shaft 6 is rotatably supported by a rolling contact bearing 9 in the housing 8 and outwardly sealed by a seal 10 in the form of a shaft sealing ring relative to the housing 8. At its input end, the first shaft 6 comprises longitudinal teeth for connecting, in a rotationally fast way, to a sideshaft gear of a differential drive (not shown). At its output end, the first shaft 6 comprises a flange 12 for connecting to a sideshaft of a motor vehicle (not shown). The second shaft 7 is supported by a friction bearing on the first shaft 6 and comprises longitudinal teeth for connecting in a rotationally fast way, to a differential carrier (not shown).

The transmission stage 3 comprises a first sun gear 13 which is integrally connected to the second shaft 7, a plurality of planetary gears 14 engaging the teeth of the first sun gear 13, and a second sun gear 15 which engages the planetary gears and which is connected in a rotationally fast way to the first shaft 6 via longitudinal teeth. The planetary gears 14 are designed so as to be integral and comprise two toothed portions one of which engages the first sun gear 13 and the other one the second sun gear 15. The teeth are helical teeth in order to achieve an advantageous NVH (noise vibration harshness) behavior. An axial bearing 11 is provided between the two sun gears 13, 15. To achieve a speed ratio between the first shaft 6 and the second shaft 7, the two sun gears 13, 15 comprise different numbers of teeth. The number of teeth of the planetary gears 14 and of the sun gears 13, 15 have been selected to be such that a speed differential of up to 20% is achieved between the first shaft 6 and the second shaft 7. The planetary gears 14 are rotatably received on journals 16 in a carrier element 17 by needle bearings 18. The carrier element 17 is basket-shaped and largely closed towards the outside. At the outer circumferential face of the carrier element 17 there are provided engagement grooves 19 which engage the inner plates 20 of the friction coupling 4 in a rotationally fast way.

The friction coupling 4, in addition to the inner plates 20 which are axially displaceably held on the axis of rotation A, comprises outer plates 21 which are coaxially arranged thereto and which are held in a rotationally fast way relative to the housing 8 and which are held so as to be axially displaceable along the axis of rotation A. The outer plates 21 and the inner plates 20 are arranged so as to alternate in the axial direction and jointly form a plate package 22 which is axially supported relative to the housing 8 via a supporting plate 55. By actuating the friction coupling 4, the rotating carrier element 17 of the transmission stage 3 is braked relative to the stationary housing 8 in order to draw off an additional torque directly at the differential carrier and transfer same via the second shaft 7 and the transmission stage 3 on to the first shaft 6. A force sensor 23 is fixed in the housing 8. Against the force sensor 23, some of the outer plates 21 with a cam 24 each in the circumferential direction are supported. The two central ones of the four outer plates comprise the cams 24 which load the force sensor 23. All the outer plates 21, on their side diametrically opposite the force sensor 23, are pivotably supported on a pin 31 which is fixed in the housing 8. The force sensor 23 is held in the housing 8 in such a way that, due to the friction coupling 4 being actuated, it is force-loaded by the cams 24 in an operating direction extending at a distance from and transversely to the longitudinal axis A. The coupling moment is calculated by a controller such as a computer unit (not shown) on the basis of the forces measured by the force sensor 23. The coupling moment is used as an input parameter for a control system (not shown) for controlling the driving dynamics of the motor vehicle, which control system controls the variable distribution of the driving moments on to the driving axles.

Figure 4:
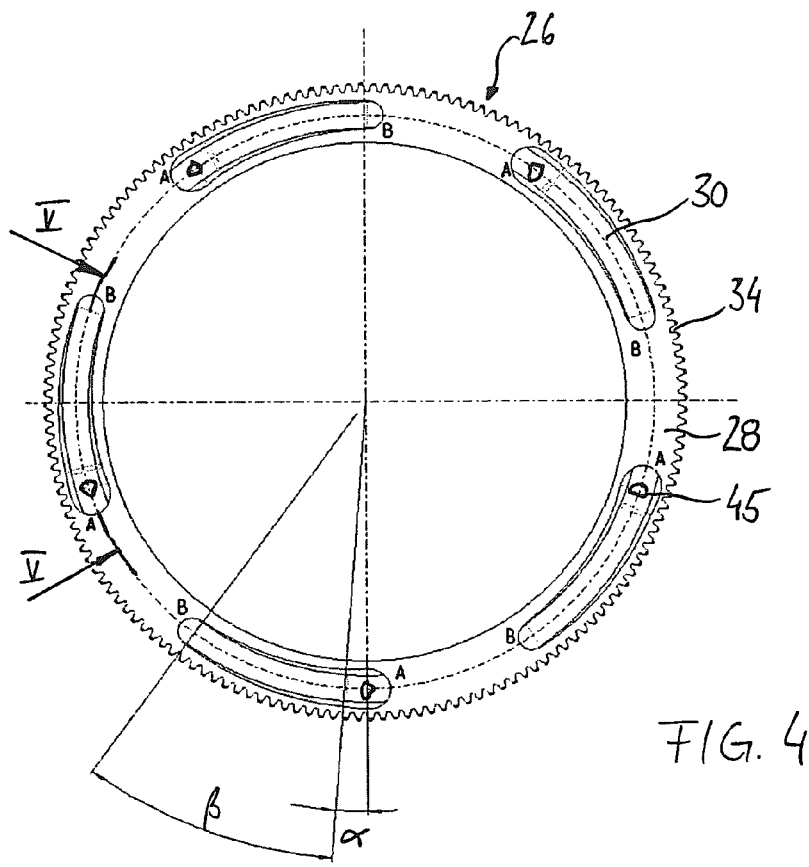
FIG. 4 is a plan view of the setting disc of the axial setting device according to FIG. 1.
Figure 3:
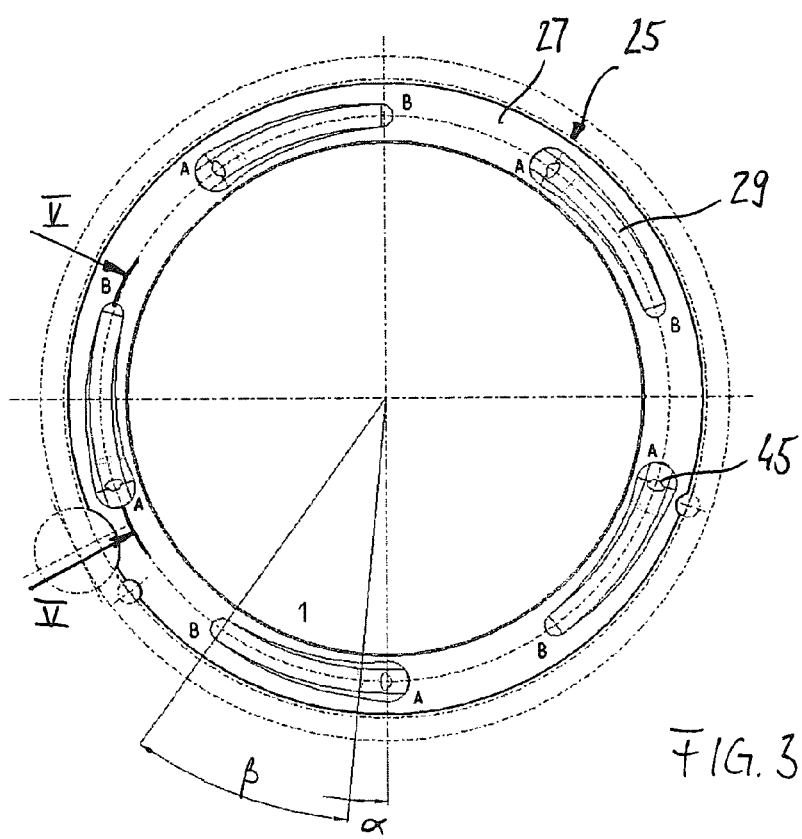
FIG. 3 is a plan view of the supporting disc of the axial setting device according to FIG. 1.

The inventive axial setting device 5 operates the friction coupling 4 for the purpose of generating the necessary coupling moment. The axial setting device 5 is provided in the form of a ball ramp assembly which comprises two discs 25, 26 arranged so as to be centered on the axis of rotation A. The first one of the discs is provided in the form of a supporting disc 25 which is axially supported and held in a rotationally fast way in a housing part (not illustrated). The second disc is provided in the form of an axially displaceable and rotatingly drivable setting disc 26. As shown in FIGS. 3 and 4, the two discs 25, 26, on their respective end faces 27, 28 facing one another, each comprise five circumferentially distributed and circumferentially extending ball grooves 29, 30 whose depth is variable in opposite directions. Each pair of opposed ball grooves 29, 30 receives a ball 32 via which the two discs 25, 26 support one another. An annular-disc-shaped cage 33 with circumferentially distributed windows is provided axially between the two discs 25, 26. In each window, there is received one of the balls 32 which are thus held in the circumferential direction in a defined position relative to one another. Whereas the supporting disc 25 is radially fixed in the housing part, the setting disc 26 is radially supported via the balls 32 relative to the supporting disc 25.

In the starting position, i.e. when the friction coupling 4 is fully open, the setting disc 26 and the supporting disc 25 are in the closest possible position relative to one another. When the setting disc 26 is rotated, the pairs of ball grooves 29, 30 rotate relative to one another, so that the balls 32 run into regions with a smaller depth. There thus occurs a spreading effect between the discs 25, 26, with the setting disc 26 being axially displaced towards the friction coupling 4. To achieve the rotational movement of the setting disc 26, the setting disc 26 is provided with outer teeth 34 on its outer circumferential face. The outer teeth 34 are engaged by a pinion (not illustrated) which is drivingly connected to an electric motor 36 via a pair of gears 35.

Figure 5:
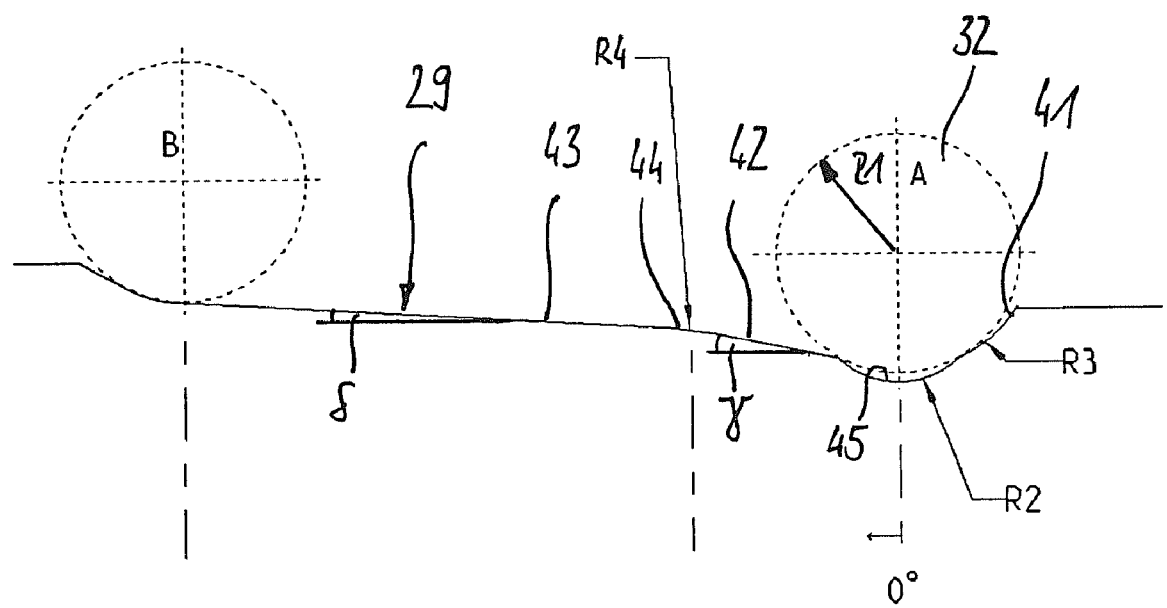
FIG. 5 shows a ball groove in a circumferential section through the groove base according to sectional line V-V in FIG. 3 or 4.

On its reverse side, the setting disc 26 comprises a radial pressure face 37 which, via an intermediate axial bearing 38, axially loads a pressure plate 39. The axial bearing is provided in the form of a needle bearing 38 which abuts the pressure plate 39 which, in turn, acts on the plate package 22 of the friction coupling 4. Thus, by actuating the ball ramp assembly 5, the friction coupling 4 is locked in a predetermined way, thus coupling the rotating transmission stage 3 to the stationary housing 8. To open the friction coupling again, the electric motor is actuated in the opposite direction, with pressure springs 40, which are axially supported on the housing 8 and which load the setting disc 26, effecting a repositioning of the setting disc 26 towards the supporting disc 25. In order to allow the two discs 25, 26 during the repositioning movement to rotate beyond the maximum groove depth, the ball grooves 29, 30 of the two discs in the region adjoining the end position defined by the maximum groove depth, each comprise a rising run-out 41 which is shown in FIG. 5. The run-out 41 ensures that the two discs 25, 26, after having passed their deepest point, again separate from one another so that the pressure springs 40 are again shortened. In consequence, the rotor mass and the entire rotational mass of the drive are spring-suspended via the returning force of the pressure springs when swinging beyond the end position. When viewed in a cylindrical section through the groove base, the run-outs 41 have an arch-shaped course whose radius R3 is greater than the radius R1 of the balls 32.

The ball grooves 29, 30 of the two discs 25, 26 correspond to one another, i.e. the ball grooves 29, 30 of the supporting disc and of the setting disc comprise the same profile. FIG. 5 shows a ball groove 29 taking the place for both discs 25, 26 in the cylindrical section through the groove base. It can be seen that the ball groove 29 comprises a first groove portion 42 with a greater first pitch and an adjoining second groove portion 43 with a smaller second pitch. The first groove portion 42 extends over a first circular-arch-shaped portion a of approximately 5° with a linear pitch γ of approximately 7.5° (FIGS. 3 and 4). Said first groove portion 42 is relatively steep, so that a long setting path is covered as a function of the angle of rotation. This is advantageous for quickly overcoming the coupling play of the friction coupling 4, starting from the non-actuated condition. The second groove portion 43 extends over a second circular-arch-shaped portion β of approximately 35° with a linear pitch δ of approximately 1.5°. The flat linear rise of the second groove portion 43 is particularly advantageous for the operating range of the friction coupling 4 to be able to set the friction moment accurately. Between the two groove portions 42, 43, there is provided a connecting transition portion 44 which is curved with a relatively small radius R4 and comprises a relatively short length.

The ratio of the circular-arch-shaped portion of the first groove portion 42 relative to the circular-arch-shaped portion of the second groove portion 43 can be smaller than 0.2, i.e. α/β<0.2.

The first groove portions 42, starting from a region of maximum groove depth, can extend over a circular-arch-shaped portion of maximum 10°. The second groove portions 43 adjoining the first groove portions can extend over a circular-arch-shaped portion of maximum 50°. Between the two groove portions there is provided a connecting transition portion 44 which comprises a relatively short length and a small radius. Furthermore, the first groove portion can comprise a linear pitch which, according to an advantageous embodiment, ranges between 5° and 10°. This results in a particularly short reaction time. The second groove portion can comprise a linear pitch which, according to another advantageous embodiment, ranges between 1.5° and 2.5°. This achieves easy control of the friction coupling.

To be able to calibrate the system during operation, i.e. to define a zero point position, the ball grooves 29, 30 of the two discs 25, 26 in the region of their maximum groove depth comprise engagement recesses 45 which can be engaged by the associated balls 32. The engagement recesses 45 have the shape of a hollow sphere and have a radius R2 which is smaller than the radius R1 of the balls 32. This means that, if viewed in the cylindrical section through the groove base, the balls 32 are supported in two points and are held in a defined circumferential position. The zero point position of the ball 32 is referred to by 'A' in FIG. 5 whereas the ball position with the greatest axial spread is referred to by 'B'.

Figure 6:
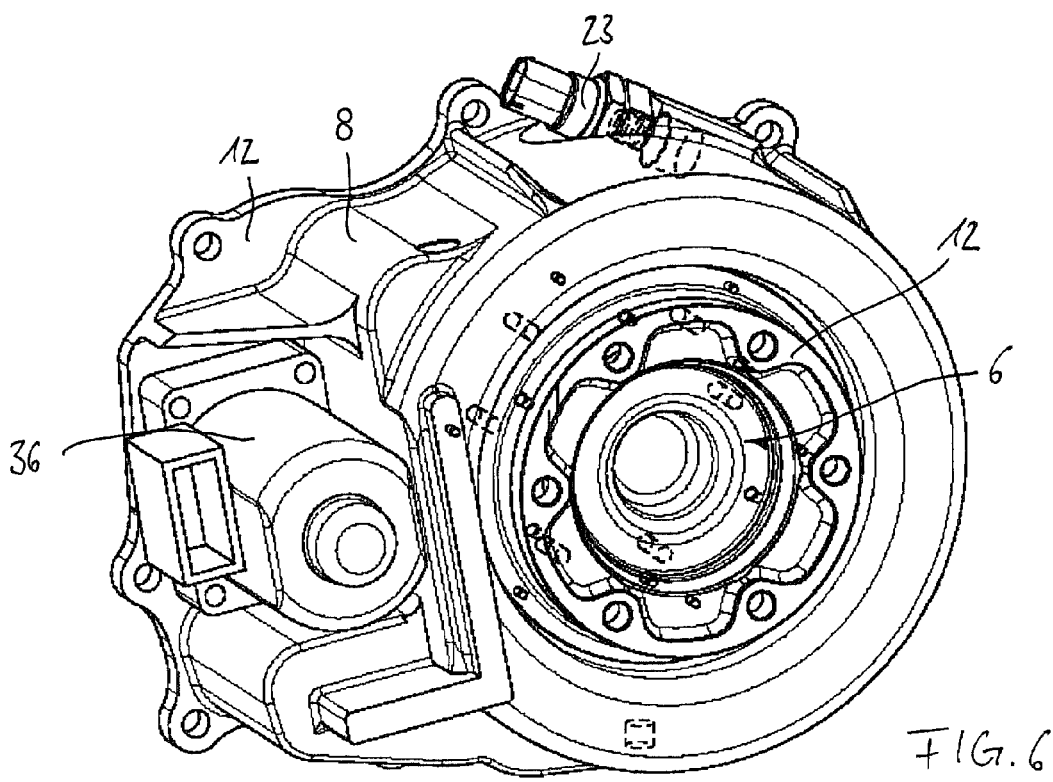
FIG. 6 is a perspective view of the transmission assembly according to FIG. 1.

Overall, the inventive axial setting device 5 comprises an extremely short reaction time and a sensitive operating range, and if the system is calibrated regularly, accurate control conditions are ensured over the entire service life. The transmission assembly 2 provided with the axial setting device 5 in accordance with the invention thus permits an accurate control of the driving moments of the motor vehicle. In FIG. 6, the transmission assembly 2 is shown as a complete unit whereas of the inventive axial setting device 5 only the electric motor 36 can be seen.

Figure 7:
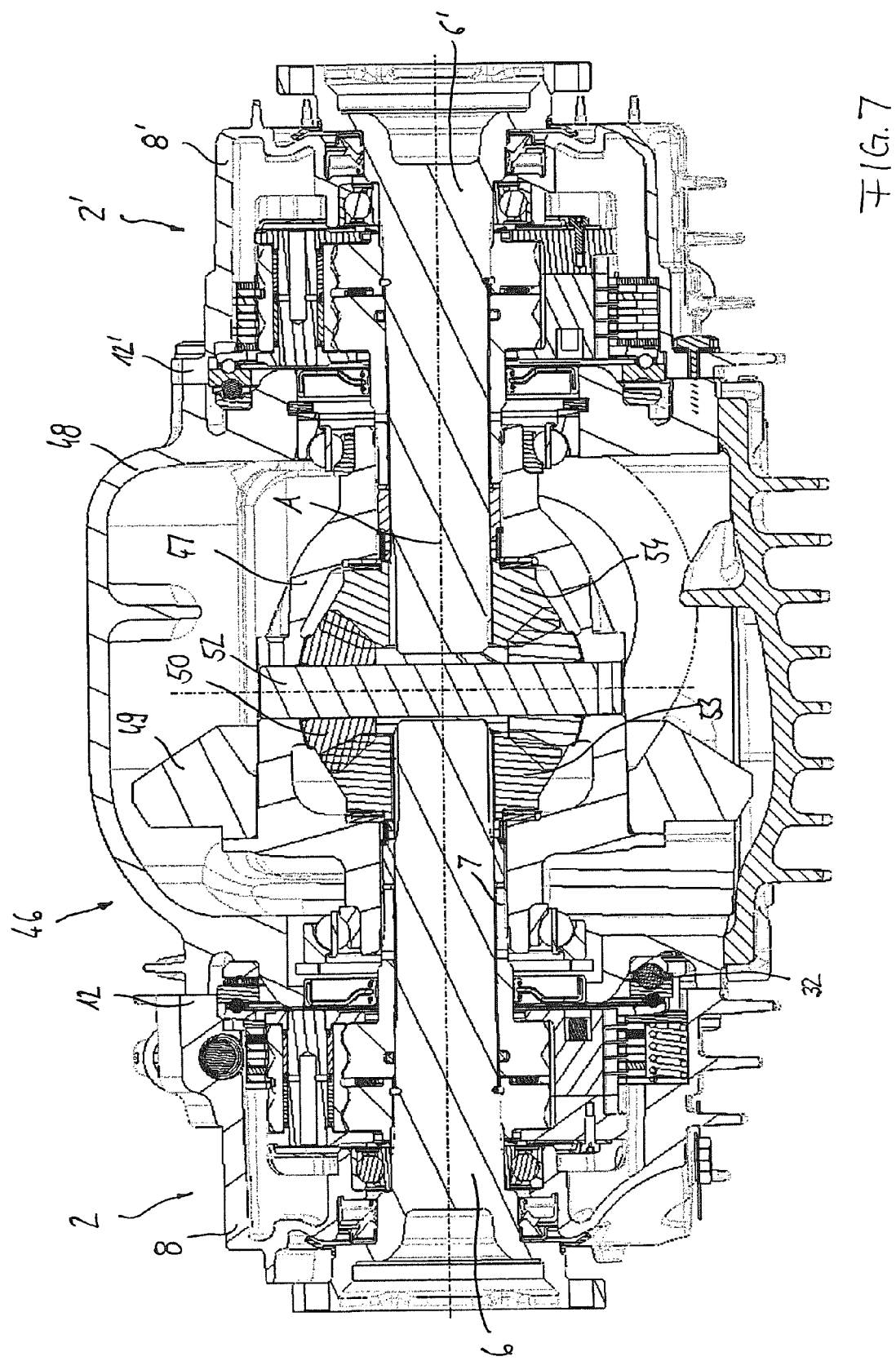
FIG. 7 is a longitudinal section through a differential assembly with two drive assemblies according to FIG. 1.

FIG. 7 shows a differential drive 46 featuring a variable torque distribution for the driveline of a motor vehicle. The differential drive 46 is driven via a driveshaft by a multi-step reduction gear and the incoming torque is distributed to two sideshafts 6, 6'. The differential drive 46 comprises a differential carrier 47 which is rotatably supported in a stationary differential housing 48 around an axis of rotation A. A ring gear 49 driven by the driveshaft is fixed in the differential carrier 47. In the differential carrier 47, a plurality of differential gears 50 is rotatably supported on journals 52 which are positioned perpendicularly relative to the axis of rotation A and which rotate together with the differential carrier 47. Two sideshaft gears 53, 54 which serve to transmit torque to the sideshafts 6, 6' engage the differential gears 50.

On each side of and adjoining to the differential housing 48, there is provided a transmission assembly 2, 2' which, in respect of design and mode of functioning, correspond to the embodiment according to FIG. 1. To that extent, reference is made to the above description which applies equally to both transmission assemblies 2, 2'. The transmission assemblies 2, 2' with their housings 8, 8' are connected via flange connections 12, 12' to the differential housing 48. In the present embodiment, the force sensor of the righthand transmission assembly is in a different sectional plane so that it is not visible. It can be seen that the first shaft 6 of the lefthand transmission assembly 2 forms the lefthand sideshaft and is connected in a rotationally fast way via a splined connection to the associated lefthand sideshaft gear 53 of the differential 46. The second shaft 7 of the lefthand transmission assembly 2, which is provided in the form of a hollow shaft, is connected in a rotationally fast way via a splined connection to the differential carrier 47. The righthand transmission assembly 2' is connected analogously.

The differential assemblies 2, 2' with their inventive axial setting devices 5, 5' permit accurate control the friction couplings 4, 4' in order to generate the required coupling moment. This leads to an accurate control of the driving dynamics of the motor vehicle and thus to an increased driving stability.

While the invention has been described in connection with several embodiments, it should be understood that the invention is not limited to those embodiments. Thus, the invention covers all alternatives, modifications, and equivalents as may be included in the spirit and scope of the appended claims.

What is claimed is:

1. An axial setting device in the form of a ball ramp assembly for actuating a friction coupling in the driveline of a motor vehicle, comprising:

two discs which are centered on a common axis (A), of which one is axially supported and the other one is axially displaceable and of which at least one is rotatingly drivable;

the two discs, on their end faces facing one another, each comprises a plurality of ball grooves extending solely in the circumferential direction;

wherein in a plan view of the end faces, the ball grooves, starting from a region of the greatest groove depth, each comprises a depth which decreases in the same circumferential direction, wherein each pair of opposed ball grooves accommodates a ball via which the first and the second discs are supported relative to one another;

wherein at least the ball grooves of one of the two discs, starting from the region of the greatest groove depth, comprise a first groove portion with a greater pitch and an adjoining second groove portion with a smaller pitch, the two pitches being different from zero, wherein the first groove portion extends over a smaller circular-arch-shaped portion ($\alpha$) than the second groove portion which extends over a larger circular-arch-shaped portion ($\beta$); and wherein, in the region adjoining a starting position defined by a maximum groove depth, all the ball grooves of the two discs comprise a rising run-out, which has a greater radius than the balls.

2. An axial setting device according to claim 1, wherein a ratio of the circular-arch-shaped portion (a) of the first groove portion to the circular-arch-shaped portion ($\beta$) of the second groove portion is less than 0.2.

3. An axial setting device according to claim 1, wherein the first groove portion starting from a region of maximum groove depth, extends over a circular-arch-shaped portion ($\alpha$) of maximum 10°.

4. An axial setting device according to claim 1, wherein the second groove portion extends over a circular-arch-shaped portion ($\beta$) of maximum 50°.

5. An axial setting device according to claim 1, comprising, between the first groove portion and the second groove portion, a transition portion with a radius (R4).

6. An axial setting device according to claim 1, wherein the run-out, if viewed in a cylindrical section through a groove base, extends concavely, and includes an arch-shaped course which has a greater radius than the balls.

7. An axial setting device according to claim 1, wherein the ball grooves of the two discs are designed so as to correspond to one another.

8. An axial setting device according to claim 1, wherein the axially displaceable disc is loaded by a spring towards the axially supported disc.

9. An axial setting device according to claim 1, wherein the first groove portion comprises a linear pitch.

10. An axial setting device according to claim 9, wherein the pitch is 5° to 10°.

11. An axial setting device according to claim 1, wherein the second groove portion comprises a linear pitch.

12. An axial setting device according to claim 11, wherein the pitch is 1.5° to 2.5°.

13. An axial setting device according to claim 1, wherein at least some of the ball grooves, in a region of their maximum groove depth, comprise engagement recesses which are deeper than the first groove portion and which the associated balls are able to engage in order to define a zero point position.

14. An axial setting device according to claim 13, wherein the engagement recesses are designed in such a way that, if viewed in the circumferential section through a groove base, the balls are supported in two points.

15. A transmission assembly for variably distributing torque in the driveline of a motor vehicle, comprising:
   a first shaft which is supported relative to a stationary housing so as to be rotatable around a longitudinal axis (A);
   a second shaft coaxially arranged thereto and being drivingly connected to the first shaft;
   a transmission stage arranged in the torque flow between the first shaft and the second shaft and having a first sun gear connected to the second shaft in a rotationally fast way, a second sun gear connected to the first shaft in a rotationally fast way, at least one planetary gear engaging the first and second sun gears, and a carrier element carrying the at least one planetary gear and being able to rotate around the longitudinal axis (A);
   a friction coupling for coupling the carrier element to the housing and which comprises outer plates connected to the housing in a rotationally fast way and inner plates connected to the carrier element in a rotationally fast way, wherein the outer plates and the inner plates are arranged axially alternately and jointly form a plate package; and
   an axial setting device in the form of a ball ramp assembly with two discs which are centered on the axis (A), of which one is axially supported relative to the housing and of which the other one is axially displaceable and of which at least one is rotatingly drivable by an electric device, wherein the axially displaceable disc is loaded by a spring towards the axially supported disc, wherein the two discs, on their end faces facing one another, each comprises a plurality of ball grooves extending in the circumferential direction, wherein the ball grooves, in a plan view of the end faces, starting from a region of the greatest groove depth, each comprises a depth which decreases in the same circumferential direction, wherein in pairs of opposed ball grooves, there is accommodated a ball via which the first and the second discs are supported relative to one another; wherein at least the ball grooves of one of the two discs, starting from the region of the greatest groove depth, comprise a first groove portion with a greater pitch and an adjoining second groove portion with a smaller pitch, the two pitches being different from zero, wherein the first groove portion extends over a smaller circular-arch-shaped portion ($\alpha$) than the second groove portion which extends over a larger circular-arch-shaped portion ($\beta$).

16. A transmission assembly according to claim 15, wherein, in the region adjoining a starting position defined by a maximum groove depth, all the ball grooves of the two discs comprise a rising run-out, which has a greater radius than the balls, and wherein the first groove portion starting from a region of maximum groove depth, extends over a circular-arch-shaped portion ($\alpha$) of the maximum 10°.

17. A transmission assembly according to claim 15, wherein, in the region adjoining a starting position defined by a maximum groove depth, all the ball grooves of the two discs comprise a rising run-out, which has a greater radius than the balls, and wherein at least some of the ball grooves, in a region of their maximum groove depth, comprise engagement recesses which are deeper than the first groove portion and which the associated balls are able to engage in order to define a zero point position.

18. A transmission assembly according to claim 15, wherein the axially supported disc is held in the housing in a rotationally fixed way, and wherein the axially displaceable disc is rotatingly driveable by the electric device.

19. An axial setting device in the form of a ball ramp assembly for actuating a friction coupling in the driveline of a motor vehicle, comprising:
   two discs which are centered on a common axis (A), of which one is axially supported and the other one is axially displaceable and of which at least one is rotatingly drivable;

the two discs, on their end faces facing one another, each comprise a plurality of ball grooves extending in the circumferential direction;

in a plan view of the end faces, the ball grooves, starting from a region of the greatest groove depth, each comprises a depth which decreases in the same circumferential direction, wherein each pair of opposed ball grooves accommodates a ball via which the first and the second discs are supported relative to one another;

wherein at least the ball grooves of one of the two discs, starting from the region of the greatest groove depth, comprise a first groove portion with a first pitch and an adjoining second groove portion with a second pitch, and a transition portion arranged between the first groove portion and the second groove portion, said transition portion having a radius (R4), wherein said first and second pitch being different from zero and said first pitch being greater than said second pitch and said second pitch being linear, wherein the first groove portion extends over a first circular-arch-shaped portion ($\alpha$) and the second groove portion extends over a second circular-arch-shaped portion ($\beta$), said second circular-arch-shaped portion ($\beta$) being more than twice as long as the first circular-arch shaped portion ($\alpha$); and wherein, in the region adjoining a starting position defined by a maximum groove depth, all the ball grooves of the two discs comprise a rising run-out, which has a greater radius than the balls.

* * * * *